UNITED STATES PATENT OFFICE.

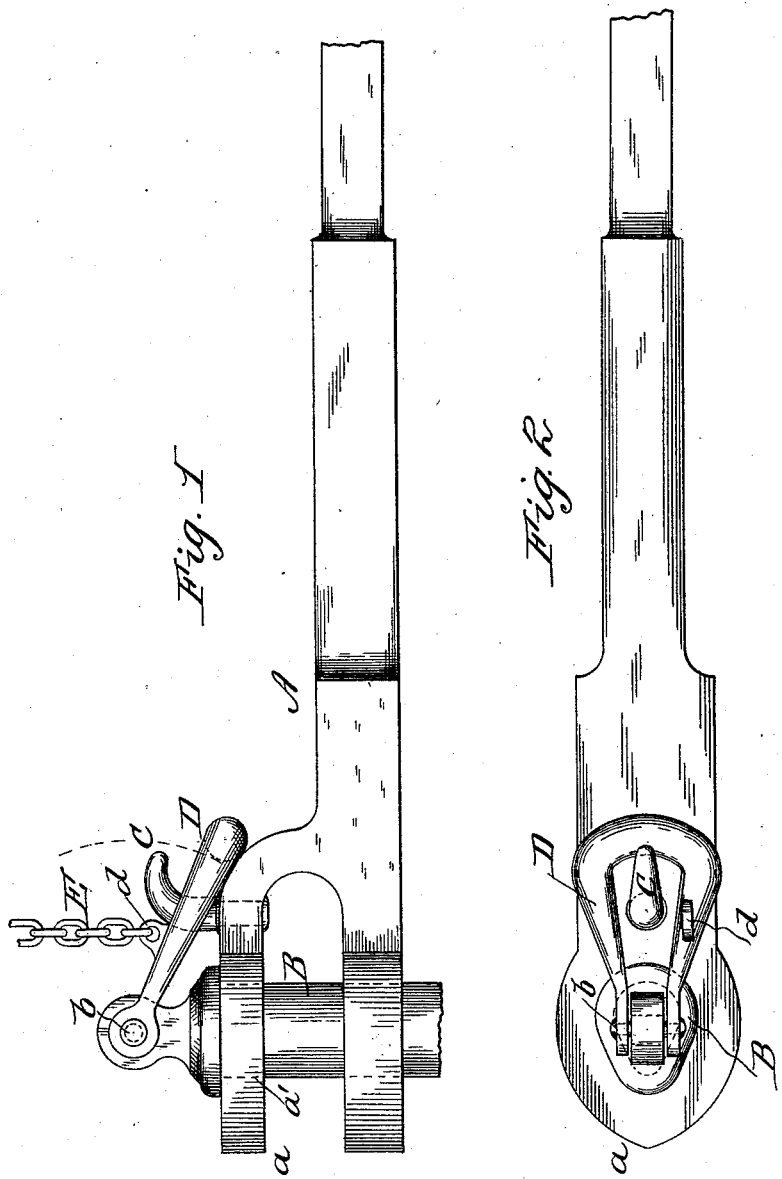

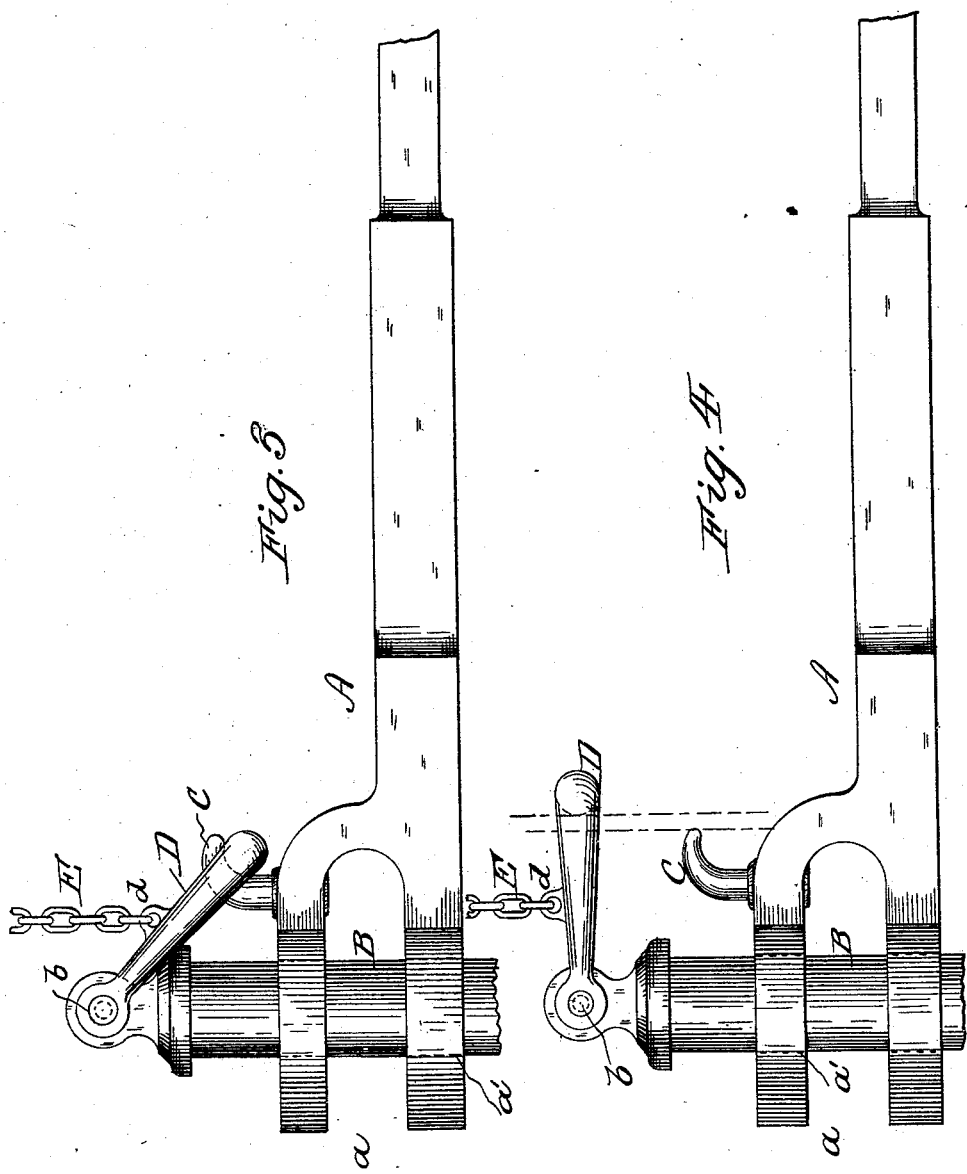

JOHN A. BRILL, OF PHILADELPHIA, PENNSYLVANIA.

CAR-COUPLING.

SPECIFICATION forming part of Letters Patent No. 351,734, dated November 2, 1886.

Application filed September 17, 1886. Serial No. 213,803. (No model.)

*To all whom it may concern:*

Be it known that I, JOHN A. BRILL, a citizen of the United States, residing at Philadelphia, in the county of Philadelphia and State of Pennsylvania, have invented certain new and useful Improvements in Coupling-Pins for Draw-Heads, of which the following is a specification, reference being had therein to the accompanying drawings, wherein—

Figure 1 is a side elevation showing draw-head, coupling-pin, and locking devices for the pin embodying my improvements. Fig. 2 is a plan of the same. Fig. 3 is a side elevation, similar to Fig. 1, showing locking position of the coupling-pin to prevent accidental displacement or withdrawal from the draw-head; and Fig. 4 is a like view showing manner of lifting the coupling-pin and locking devices from the draw-head.

My invention has relation to coupling-pins for draw-heads for cars or similar fixtures of the form having devices for preventing accidental displacement of the coupling-pin; and it has for its object the provision of simple, economical, and effective devices for preventing accidental lifting or raising of the coupling-pin from the draw-head, which devices are especially applicable for draw-heads for street-cars.

My invention accordingly consists of a draw-head having a hoop or stud back of the coupling-pin, a link pivoted to the pin and fitting or passing over the stud, and a chain or like connection for the link, whereby the coupling-pin cannot be manually nor accidentally lifted out of the draw-head without first raising the link.

In the drawings, A shows a draw-head suitable for street-cars, having bifurcated coupling or front end, *a*, provided with openings *a'* for the coupling-pin B. On the draw-head, back of the pin B, is a fixed hook or stud, C, curved rearwardly or otherwise suitably configured, as desired, and is either secured to or forms a part of the draw-head. To the pin B, at or near its upper end or head, *b*, is pivoted a link, D, having preferably a chain, E, which may be connected to the draw-head or car, as desired. The link D is of a length that its rear end clears the stud or hook C when the link is raised on its pivot-point by hand or by the chain when the pin B is down upon or in position in the draw-head, as shown in Fig. 1.

The link D, being pivoted at one end, maintains its position by gravity, so that if the pin B is lifted without first raising the link D the latter is drawn toward and engages with the stud C, as shown in Fig. 3, to lock the pin or prevent it rising out of the draw-head. By elevating the link first, or raising the link and pin together, the link clears the stud C, (see Fig. 4,) and the pin is free for withdrawal from the draw-head. To insert the pin in the latter, it is dropped into opening *a'* in the usual manner, and the link is then passed over the stud.

The chain E is used for convenience in raising the link D, in which case the latter is provided with a lug, *d;* but said chain may be dispensed with, if desired, and the hand is then applied directly to the link to raise it.

What I claim is—

1. A draw-head having a coupling-pin, a stud back of the pin, and a link one end of which is pivoted to the head of the pin and the other fits or passes over said stud, substantially as set forth.

2. The combination of draw-head A, pin B, having pivoted link D, and stud C, substantially as shown and described.

3. In a draw-head having pin B and stud C, the link D, pivoted at one end to pin B, and having chain E, substantially as set forth.

In testimony whereof I affix my signature in presence of two witnesses.

JOHN A. BRILL.

Witnesses:
I. B. W. BIDLACK,
E. A. LEOPOLD.